(12) United States Patent
Driker et al.

(10) Patent No.: US 7,720,898 B2
(45) Date of Patent: May 18, 2010

(54) APPARATUS AND METHOD FOR ADJUSTING EXPONENTS OF FLOATING POINT NUMBERS

(75) Inventors: Alexander Driker, San Diego, CA (US); Cristian Duroiu, San Diego, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 864 days.

(21) Appl. No.: 10/460,019

(22) Filed: Jun. 11, 2003

(65) Prior Publication Data

US 2004/0254970 A1    Dec. 16, 2004

(51) Int. Cl.
    *G06F 7/38* (2006.01)
(52) U.S. Cl. .................. 708/497; 708/205; 708/505
(58) Field of Classification Search .............. 708/501, 708/505
    See application file for complete search history.

(56) References Cited

U.S. PATENT DOCUMENTS 5,197,023 A * 3/1993 Nakayama .................. 708/505
5,373,461 A * 12/1994 Bearden et al. ............. 708/505
5,954,790 A * 9/1999 Wong ......................... 708/505

* cited by examiner

*Primary Examiner*—Chuong D Ngo
(74) *Attorney, Agent, or Firm*—Lisa K Jorgenson; William A. Munck

(57) ABSTRACT

A floating point unit, a central processing unit, and a method are provided for adjusting the exponent of a floating point number. During an addition or subtraction of two floating point numbers, the significand of the floating point result is rounded, and the exponent of the result may be adjusted due to normalization or renormalization. The exponent adjustment due to renormalization or the exponent adjustment due to normalization and renormalization is combined with the significand rounding operation.

20 Claims, 2 Drawing Sheets

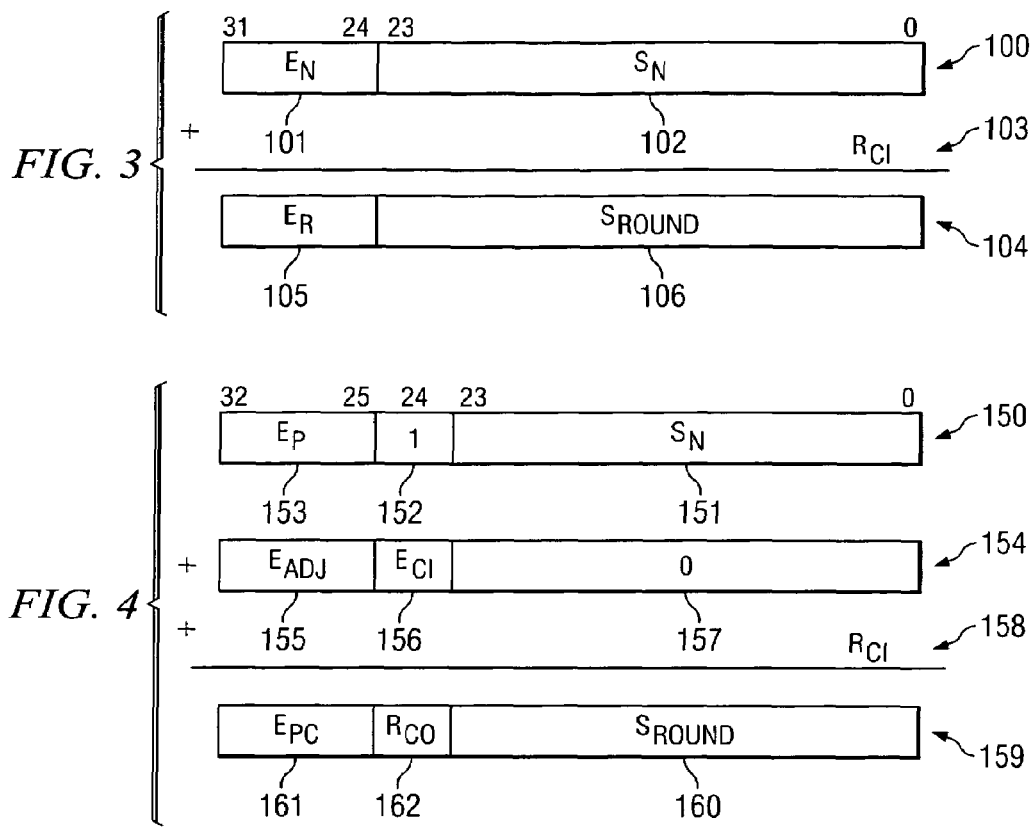
FIG. 3
FIG. 4
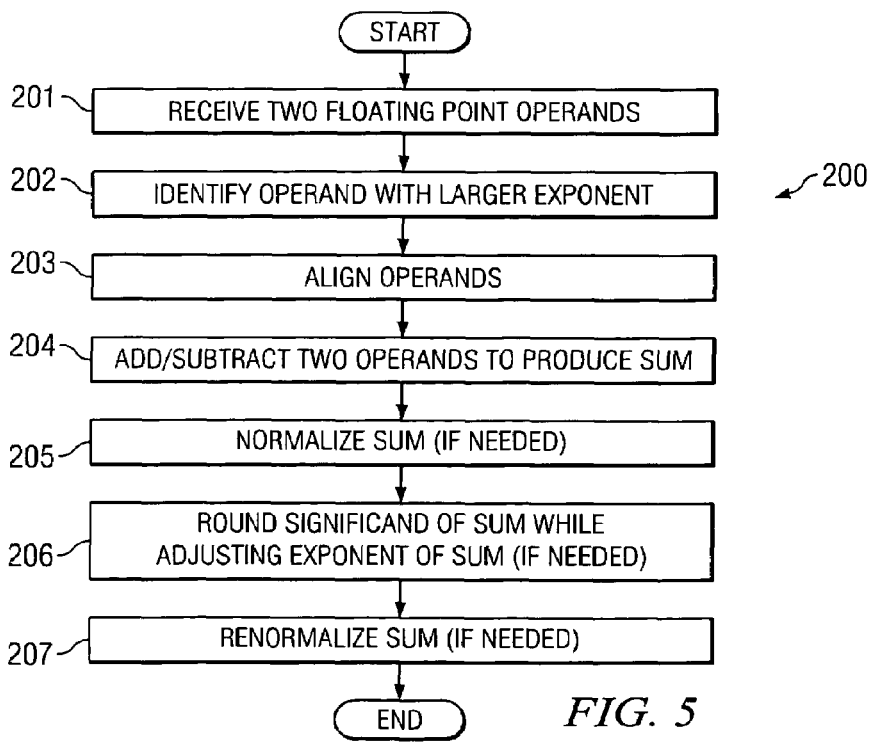
FIG. 5

US 7,720,898 B2

APPARATUS AND METHOD FOR ADJUSTING EXPONENTS OF FLOATING POINT NUMBERS

TECHNICAL FIELD

This disclosure relates generally to computing systems and more specifically to an apparatus and method for adjusting exponents of floating point numbers.

BACKGROUND

Computing systems typically have the ability to process floating point numbers. A floating point number is often represented using a sign-mantissa-exponent format of:

$$(-1)^S * 1.xxxx * 2^{yyyy},$$

where S is the sign, xxxx is the mantissa, and yyyy is the exponent. The floating point number is positive when S is 0 and negative when S is 1. The 1.xxxx is usually referred to as the "significand" of the floating point number. The sign and significand together create a "sign-magnitude" representation. The position to the left of the decimal point in the significand is called the "integer" bit. The integer bit can either be explicitly included in a floating point format or excluded. When the integer bit is excluded, it is called a "hidden" integer bit. For example, the Institute of Electrical and Electronics Engineers (IEEE) 754 floating point standard defines single precision and double precision floating point numbers having hidden integer bits. The size of the mantissa and the size of the exponent may vary depending on the type of precision used.

Conventional computing systems typically try to keep floating point numbers in a "normalized" format. The normalized format requires that the significand have a form of 1.xxxx. In other words, the significand has a single value of one to the left of the decimal point. When the significand has a form of 10.xxxx or 0.xxxx, the floating point number is said to have a "denormalized" format.

When two floating point numbers are added or subtracted, the floating point result may have a denormalized format. Normalization usually occurs, and the normalized result is then rounded. Rounding may also denormalize the floating point result, so renormalization occurs. During the normalization and renormalization operations, conventional computing systems may adjust the exponent of the result. A problem with conventional computing systems is that separate adders are often used to adjust the exponent of the result during the normalization and renormalization operations. A third adder is typically used to round the significand of the result during the rounding operation. As a result, three adders are usually needed to adjust the exponent and round the floating point result.

SUMMARY

This disclosure provides an apparatus and method for adjusting exponents of floating point numbers In one aspect, a method includes adding two floating point operands to produce a sum. The sum includes an exponent. The method also includes normalizing at least a portion of the sum. The method further includes rounding the sum and adjusting the exponent during the rounding. In addition, the method includes renormalizing a portion of the sum. Adjusting the exponent compensates for the renormalization of the portion of the sum.

In a particular aspect, normalizing at least a portion of the sum includes normalizing at least one of a significand and a mantissa of the sum without adjusting the exponent of the sum. Also, adjusting the exponent compensates both for the normalization of the at least one significand and mantissa and for the renormalization of the portion of the sum.

In another particular aspect, normalizing at least a portion of the sum includes normalizing at least one of a significand and a mantissa of the sum and adjusting the exponent of the sum. Also, adjusting the exponent only compensates for the renormalization of the portion of the sum.

One or more technical features may be present according to various embodiments of this disclosure. Particular embodiments of this disclosure may exhibit none, some, or all of the following features depending on the implementation. For example, in some embodiments, a floating point unit that adjusts exponents of floating point numbers is provided. In particular, during an addition or subtraction of floating point numbers, the significand of the floating point result is rounded, and the exponent may be adjusted due to normalization or renormalization.

In some embodiments, the exponent adjustment due to renormalization is combined with the significand rounding operation. In other words, the exponent is adjusted and the significand is rounded in the same operation. In other embodiments, the exponent adjustments due to normalization and renormalization are combined with the significand rounding operation. As a result, a single full adder may be used to perform the rounding operation and to adjust the exponent.

In this way, one or both of the adders ordinarily used to adjust the exponent during normalization and renormalization need not be provided. As a result, less space may be needed in the floating point unit. Also, because fewer operations are needed to produce the floating point result, the floating point result may be calculated more quickly.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description, taken in conjunction with the accompanying drawings, in which:

FIG. 3 illustrates an example rounding operation that includes exponent adjustment due to renormalization according to one embodiment of this disclosure;

FIG. 4 illustrates an example rounding operation that includes exponent adjustment due to normalization and renormalization according to one embodiment of this disclosure; and FIG. 5 illustrates an example method for adjusting an exponent of a floating point number according to one embodiment of this disclosure.

DETAILED DESCRIPTION

Figure 1:
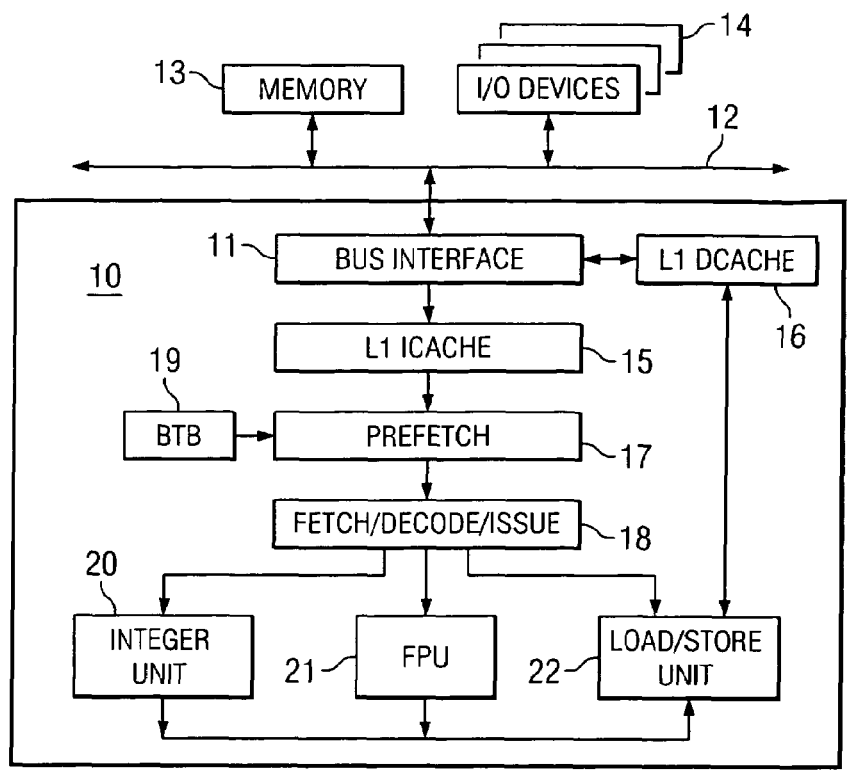
FIG. 1 illustrates an example central processing unit according to one embodiment of this disclosure.

FIG. 1 illustrates an example central processing unit (CPU) 10 according to one embodiment of this disclosure. The central processing unit 10 shown in FIG. 1 is for illustration only.

Other central processing units could be used without departing from the scope of this disclosure.

In the illustrated example, the central processing unit 10 includes a bus interface unit 11. The bus interface unit 11 facilitates communication between the central processing unit 10 and a system bus 12. The bus interface unit 11 includes any hardware, software, firmware, or combination thereof that facilitates communication over a bus. The system bus 12 includes any suitable structure or structures for transporting information to and from the central processing unit 10.

In this example, the system bus 12 facilitates communication between the central processing unit 10, a system memory 13, and one or more input/output (I/O) devices 14. The system memory 13 stores information used by the central processing unit 10, such as instructions to be executed by the central processing unit 10 and data to be used during execution of the instructions. The system memory 13 includes any volatile or non-volatile storage and retrieval device or devices, such as a random access memory (RAM) or a read-only memory (ROM). The I/O devices 14 include any suitable input or output devices, such as a keyboard, mouse, disk drive, CD drive, DVD drive, or monitor.

The central processing unit 10 retrieves data and instructions from the system memory 13. The bus interface unit 11 stores the instructions in a level 1 instruction cache (L1 ICACHE) 15 and the data in a L1 data cache (DCACHE) 16. The instruction cache 15 and the data cache 16 each represents any storage and retrieval device or devices. In a particular embodiment, the instruction cache 15 and the data cache 16 each represents a four-way set associative memory having a sixteen-byte line size and implementing a least recently used (LRU) replacement algorithm.

An instruction prefetch buffer 17 retrieves and stores at least some of the instructions contained in the instruction cache 15. The prefetch buffer 17 is provided to retrieve and store instructions before the instructions are fetched by an instruction fetch/decode unit 18. As instructions are sent to the instruction fetch/decode unit 18, new instructions are retrieved from the instruction cache 15. In this way, the prefetch buffer 17 may help to ensure that the instruction fetch/decode unit 18 has a continuous flow of instructions. The prefetch buffer 17 represents any buffer or buffers that store and facilitate retrieval of instructions.

The instruction fetch/decode unit 18 fetches instructions to be executed by the central processing unit 10. The instruction fetch/decode unit 18 also decodes the instructions and issues the decoded instructions to other components of the central processing unit 10 for execution. The instruction fetch/decode unit 18 represents any hardware, software, firmware, or combination thereof for fetching, decoding, and issuing instructions.

In some embodiments, the instructions executed by the central processing unit 10 are executed in sequential order unless "branch" or "jump" instructions change the order of execution. The target address of a branch or jump instruction is predicted and stored in a branch target buffer (BTB) 19. When a branch or jump instruction is encountered during execution, the address of the next non-sequential instruction may be retrieved from the branch target buffer 19 and used. The branch target buffer 19 represents any buffer or buffers that store and facilitate retrieval of addresses or other data related to branch and jump instructions.

Instructions decoded by the fetch/decode unit 18 may be issued to an integer unit 20, a floating point unit (FPU) 21, or a load/store unit 22. The integer unit 20 executes integer instructions retrieved by the central processing unit 10 from the system memory 13. The integer unit 20 also calculates memory addresses used by the load/store unit 22. The integer unit 20 represents any hardware, software, firmware, or combination thereof for performing integer operations.

The floating point unit 21 executes floating point instructions retrieved by the central processing unit 10 from the system memory 13. For example, the floating point unit 21 executes floating point addition and floating point subtraction operations. In this document, the phrase "effective addition" refers to a mathematical operation that, in effect, adds two operands. As an example, an effective addition may represent the addition of two positive operands or the subtraction of a negative operand from a positive operand. Also, the phrase "effective subtraction" refers to a mathematical operation that, in effect, subtracts one operand from another operand. As an example, an effective subtraction may represent the subtraction of one positive operand from another positive operand or the addition of a positive operand and a negative operand. The floating point unit 21 represents any hardware, software, firmware, or combination thereof for performing floating point operations.

The load/store unit 22 facilitates the retrieval and storage of data in the system memory 13. For example, the load/store unit 22 may store the results of a floating point operation in the system memory 13. The load/store unit 22 represents any hardware, software, firmware, or combination thereof for loading or storing data.

In one aspect of operation, floating point numbers include a mantissa portion and an exponent portion. The floating point unit 21 performs effective addition and effective subtraction operations involving floating point operands. In conventional floating point units, the result of an effective addition or effective subtraction operation may be normalized, rounded, and possibly renormalized. The normalization and renormalization operations often require an adjustment to the exponent portion of the result. For example, normalizing the result may require that the significand in the result be shifted one position to the right, which also requires the exponent in the result to be incremented. To adjust the exponent portion of the result during normalization and renormalization, conventional floating point units use two adders.

Various embodiments of this disclosure reduce the number of full adders needed during the normalization, rounding, and renormalization. In some embodiments, the adjustment of the exponent due to renormalization is performed during the rounding operation. In other embodiments, the adjustments of the exponent due to normalization and renormalization are performed during the rounding operation. In these embodiments, one or both of the adders ordinarily used during the normalization and renormalization operations to adjust the exponent need not be provided in the floating point unit 21. This may help to reduce the size and complexity of the floating point unit 21.

Although FIG. 1 illustrates one example of a central processing unit 10, various changes may be made to FIG. 1. For example, FIG. 1 illustrates one example operational environment of the floating point unit 21. The functionality of the floating point unit 21 may be used in any other central processing unit, processor, co-processor, integrated circuit, or other device.

Figure 2:
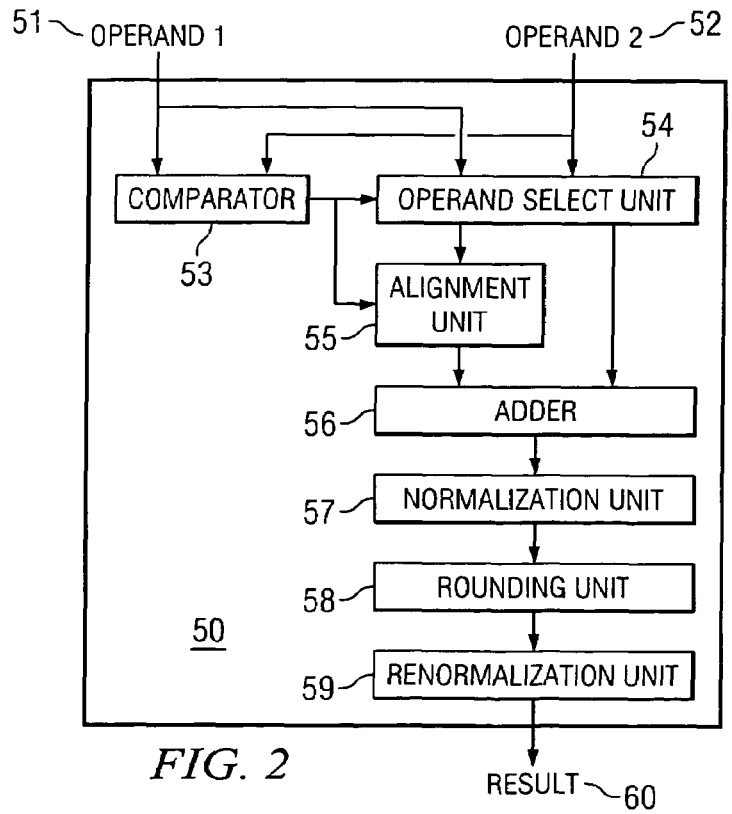
FIG. 2 illustrates a portion of an example floating point add-subtract unit according to one embodiment of this disclosure.

FIG. 2 illustrates a portion of an example floating point add-subtract unit 50 according to one embodiment of this disclosure. The floating point unit 50 may be useful, for example, as the floating point unit 21 in the central processing unit 10 of FIG. 1. The floating point unit 50 shown in FIG. 2 could be used in any other suitable central processing unit or other device without departing from the scope of this disclosure.

In the illustrated example, two operands 51 and 52 are provided to the floating point unit 50. As described above, each operand 51, 52 includes a mantissa and an exponent. As a particular example, each operand 51, 52 could include 1 sign bit, a is 23-bit mantissa, and an 8-bit exponent. A 23-bit mantissa and a hidden integer bit result in a 24-bit significand.

At least a portion of the operands 51, 52 are provided to a comparator 53 in the floating point unit 50. The comparator 53 compares the operands 51, 52 and generates an output signal based 20 on the comparison. For example, in some embodiments, the comparator 53 receives and compares the exponents of the two operands 51, 52. The comparator 53 then generates an output signal identifying the operand 51, 52 having the larger exponent. The output signal could also identify a difference between the two exponent values. The comparator 53 includes any hardware, software, firmware, or combination thereof for comparing two or more values.

An operand select unit 54 receives the two operands 51, 52 and the output of the comparator 53. The operand select unit 54 then selects which operand 51, 52 is provided to an alignment unit 55 and which is provided to an adder 56. In some embodiments, the operand select unit 54 uses the output signal from the comparator 53 to identify the operand 51, 52 with the smaller exponent. The operand select unit 54 then provides the operand 51, 52 with the smaller exponent to the alignment unit 55 and provides the operand 51, 52 with the larger exponent to the adder 56. The operand select unit 54 includes any hardware, software, firmware, or combination thereof for selecting and providing operands to different destinations.

An alignment unit 55 alters one of the operands 51, 52 so that both operands 51, 52 have equal exponents. For example, the alignment unit 55 may perform a right shift on the significand of one of the operands 51, 52. When the alignment unit 55 shifts the significand, the alignment unit 55 also increments the exponent of the operand 51, 52. When the alignment unit 55 completes operation, both operands 51, 52 have equal exponent values. In some embodiments, the alignment unit 55 uses the output of the comparator 53 to identify how much to shift the operand received from the operand select unit 54. The alignment unit 55 includes any hardware, software, firmware, or combination thereof for aligning one floating point number with another.

The two operands 51, 52 are provided to an adder 56. The adder 56 adds the operands 51, 52 to produce a sum. In some embodiments, the adder 56 adds only the significands of the operands 51, 52 to produce the sum. In these embodiments, the adder 56 does not operate on the exponent portions of the two operands 51, 52. The adder 56 includes any hardware, software, firmware, or combination thereof for adding two or more operands.

The sum produced by the adder 56 is provided to a normalization unit 57. The normalization unit 57 normalizes the sum produced by the adder 56. For example, the normalization unit 57 may shift the significand of the sum right or left so that the significand has a format of 1.xxxx. If the sum produced by the adder 56 is already in a normalized format, the normalization unit 57 need not modify the sum. In some embodiments, the normalization unit 57 modifies the exponent of the sum when the significand is normalized. In other embodiments, the normalization unit 57 does not modify the exponent of the sum when the significand is normalized. The normalization unit 57 includes any hardware, software, firmware, or combination thereof for normalizing at least a portion of a floating point number.

The sum from the normalization unit 57 is provided to a rounding unit 58, which rounds the sum. For example, the rounding unit 58 may use guard, round, and sticky (GRS) bits generated by the alignment unit 55 and adjusted by the normalization unit 57 to round the sum. The rounding unit 58 includes any hardware, software, firmware, or combination thereof for rounding a floating point number. As an example, the rounding unit 58 may include an adder.

The rounded sum from the rounding unit 58 is provided to a renormalization unit 59. Rounding the sum may cause the sum to become denormalized. As an example, rounding may cause the significand of the sum to overflow and have a format of 10.xxxx. The renormalization unit 59 receives the rounded sum and normalizes the sum (if needed) to produce a final result 60. The renormalization unit 59 includes any hardware, software, firmware, or combination thereof for normalizing a floating point number.

As described above, conventional floating point units typically use three separate adders to normalize, round, and renormalize a sum of two operands. One full adder is used to adjust the exponent during normalization. Another adder is used to round the significant during rounding. The third adder is used to adjust the exponent during renormalization.

In some embodiments of this disclosure, the adjustment of the sum's exponent due to renormalization is combined with the rounding of the significand. In these embodiments, the rounding unit 58 rounds the significand and adjusts the exponent during the same operations, and the renormalization unit 59 does not need to adjust the exponent during renormalization. As a result, a full adder is not needed to adjust the exponent in the renormalization unit 59. One example of this exponent adjustment is shown in FIG. 3, which is described below.

In other embodiments of this disclosure, the adjustments of the sum's exponent due to normalization and renormalization are combined with the rounding of the significand during rounding. In these embodiments, the rounding unit 58 rounds the significand and adjusts the exponent during the same operations. The normalization unit 57 and the renormalization unit 59 need not adjust the exponent during normalization or renormalization. As a result, an adder is not needed in either the normalization unit 57 or the renormalization unit 59 to adjust the exponent. One example of this exponent adjustment is shown in FIG. 4, which is described below.

In these embodiments, because one or more full adders are not needed in one or both of the normalization unit 57 and the renormalization unit 59, the floating point unit 50 may occupy less space than conventional floating point units. Also, in order to produce the final result 60, the floating point unit 50 need not perform one or more full additions that conventional floating point units perform. As a result, the floating point unit 50 may produce the final result 60 is less time.

Although FIG. 2 illustrates one example of a portion of a floating point unit 50, various changes may be made to FIG. 2. For example, the functional division shown in FIG. 2 is for illustration only. Various components of FIG. 2 could be combined or omitted or additional components could be added according to particular needs.

FIG. 3 illustrates an example rounding operation that includes exponent adjustment due to renormalization according to one embodiment of this disclosure. The exponent adjustment shown in FIG. 3 may, for example, be performed by the rounding unit 58 of FIG. 2 on the sum produced by the adder 56 and subsequently normalized by the normalization unit 57.

The exponent adjustment shown in FIG. 3 combines the exponent adjustment caused by renormalization with the rounding of the sum's significand. The rounding of the significand may cause the significand to overflow. When this occurs, conventional floating point units would ordinarily perform a right shift on the significand and increment the exponent. In some embodiments of this disclosure, the rounding unit 58 increments the exponent while rounding the significand, and the renormalization unit 59 does not shift the significand. This reduces or eliminates the need for the renormalization unit 59 to increment the exponent and shift the significand.

As shown in FIG. 3, the rounding unit 58 receives the sum produced by the adder 56 and normalized by the normalization unit 57. The rounding unit 58 generates an operand 100 by appending or concatenating the normalized exponent ($E_N$) 101 and the normalized significand ($S_N$) 102 produced by the normalization unit 57. In this example, the normalized exponent 101 represents an 8-bit exponent, and the normalized significand 102 represents a 24-bit significand. Any other suitable lengths could be used without departing from the scope of this disclosure.

The rounding unit 58 adds the operand 100 and a round carry-in ($R_{CI}$) 103. The round carry-in 103 represents a single bit. The round carry-in 103 has a value of either one or zero, depending on whether the operand 100 needs to be changed in order to be rounded. The rounding unit 58 may use any suitable technique to identify the value of the round carry-in 103. As an example, the central processing unit 10 may include one or more values in a register identifying how values are to be rounded (such as round to nearest-even, round to zero, round to positive infinity, and round to negative infinity). The rounding unit 58 may use these register values, the least significant bit (LSB) of the operand 100, and the GRS bits from the alignment unit 55 subsequently adjusted by the normalization unit 57 to determine a value for the round carry-in 103.

The rounding unit 58 adds the operand 100 and the round carry-in 103 to produce a rounded sum 104. The rounded sum 104 includes a rounded and renormalized exponent ($E_R$) 105 and a rounded significand ($S_R$) 106. The rounded and renormalized exponent 105 represents the exponent contained in the final result 60 produced by the floating point unit 50. In other words, the rounded and renormalized exponent 105 need not be incremented by the renormalization unit 59. The rounded significand 106 may be further processed by the renormalization unit 59, but the renormalization unit 59 need not examine and alter the exponent 105.

As described above, when the rounding unit 58 produces the rounded significand 106, the rounded significand 106 could overflow. This can be detected by comparing the least significant bit of the normalized exponent 101 and the least significant bit of the rounded and renormalized exponent 105. If both least significant bits are equal, no overflow has occurred. If overflow did occur, all bits in the rounded significand 106 would equal zero. Conventional floating point units would shift the overflowed significand 106 one position to the right and adjust the exponent. However, the rounded and renormalized exponent 105 produced by the rounding unit 58 already has the proper value, and right shifting the significand 106 would mean that the mantissa in the significand 106 still contains all zeros. As a result, the renormalization unit 59 need not perform the right shift operation.

In this way, the renormalization unit 59 does not need to increment the exponent 105 produced by the rounding unit 58. As a result, the renormalization unit 59 need not include an adder to process the exponent 105. The renormalization unit 59 also does not need to right shift the significand 106 produced by the rounding unit 58, so a shifter could be omitted from the renormalization unit 59.

Although FIG. 3 illustrates one example of a rounding operation that includes exponent adjustment due to renormalization, various changes may be made to FIG. 3. For example, FIG. 3 and its accompanying description have described the operand 100 as including a significand 102 and the rounded sum 104 as including a significand 106. In other embodiments, the significands 102, 106 could be replaced by mantissas. Also, the exponent adjustment shown in FIG. 3 has been described as being performed by the rounding unit 58 in the floating point unit 50 of FIG. 2. The exponent adjustment shown in FIG. 3 could also be performed by any other floating point unit or other device.

FIG. 4 illustrates an example rounding operation that includes exponent adjustment due to normalization and renormalization according to one embodiment of this disclosure. The exponent adjustment shown in FIG. 4 may, for example, be performed by the rounding unit 58 of FIG. 2 on the sum produced by the adder 56.

The exponent adjustment shown in FIG. 4 combines the exponent adjustment caused by normalization, the exponent adjustment caused by renormalization, and the rounding of the sum's significand. The normalization of the sum from the adder 56 could involve a single right shift to the significand (referred to as a +1 position change), no alteration of the significand (referred to as a 0 position change), or one or more left shifts to the significand (referred to as a −1, −2, etc. position change). The rounding of the significand may also cause the significand to overflow, which may require a right shift to the overflowed significand during renormalization. In some embodiments of this disclosure, the rounding unit 58 adjusts the exponent while rounding the significand, and the normalization unit 57 and renormalization unit 59 do not adjust the exponent when normalizing the significand. This reduces or eliminates the need for the normalization unit 57 and renormalization unit 59 to adjust the exponent.

As shown in FIG. 4, the rounding unit 58 produces an operand 150 by concatenating a normalized significand 151 produced by the normalization unit 57, a single bit 152 having a value of one, and a pre-normalized exponent ($E_P$) 153. In this embodiment, the exponent 153 represents the exponent of the larger operand 51, 52 as indicated by the comparator unit 53. The normalization unit 57 does not process or alter the exponent 153, which is why the exponent is referred to as a "pre-normalized" exponent.

The rounding unit 58 also produces a second operand 154 by concatenating an exponent adjustment ($E_{ADJ}$) 155, an exponent carry-in ($E_{CI}$) 156, and a string of zeros 157. The exponent adjustment 155 and the exponent carry-in 156 identify the number of position changes made to the sum's significand by the normalization unit 57. When the position change equals +1 or 0, the exponent adjustment 155 equals +1 or 0, respectively, and the exponent carry-in 156 equals 0. When the position change equals a negative number, the exponent adjustment 155 equals the one's complement of the position change, and the exponent carry-in 156 equals 1.

The rounding unit 58 adds the operand 150, the operand 154, and a round carry-in 158 to produce a partially compensated sum 159. The partially compensated sum 159 includes a rounded significand 160, a pre-compensated exponent ($E_{PC}$) 161, and a round carry-out ($R_{CO}$) 162.

The pre-compensated exponent 161 possibly represents the exponent to be included in the final result 60 produced by the floating point unit 50. The exponent 161 is referred to as "pre-compensated" because the exponent 161 represents the correct exponent in all but one exceptional situation. This situation occurs when the exponents in the original operands 51, 52 have a difference of at least two, the normalization unit 57 shifted the sum produced by the adder 56 by one position to the left (a position change of −1), and the significand overflows due to rounding. In this case, the pre-compensated exponent 161 needs to be decremented by one (after having just been incremented by one).

In particular embodiments, the rounding unit 58 determines whether the exceptional situation has occurred using the logic formulas:

$$\text{Test} = \text{EffSub} \& E_{CI} \& R_{CO}$$

$$E_R = \text{Test}?E_P:E_{PC},$$

where $E_R$ represents the correct exponent value to be included in the final result 60, Test is a flag identifying whether the exceptional situation has occurred, EffSub identifies whether an effective subtraction is occurring, $E_{CI}$ represents the exponent carry-in 156, $R_{CO}$ represents the round carry-out 162, $E_P$ represents the pre-normalized exponent 153, $E_{PC}$ represents the pre-compensated exponent 161, "&" is a logical "and" operator, and "(Condition) ? A:B" is a selection operator which selects "A" when "Condition" is true and "B" when "Condition" is false. However, the detection of the special case is not limited to the equations shown above and may be accomplished by other ways.

As described above, when the rounding unit 58 produces the rounded significand 160, the rounded significand 160 could overflow. This can be detected using the logic formula:

$$\text{Overflow} = (E_{CI} \hat{} R_{CO})$$

where Overflow is a flag identifying whether overflow has occurred, "^" is an "exclusive-or" logical operator, and "!" is a logical negate operator. The rounding unit 58 can provide the Overflow value to the renormalization unit 59, which uses the value to decide whether the significand 160 needs to be renormalized. By using this logic formula at the rounding unit 58 to identify when overflow occurs, the renormalization unit 59 need not examine the actual contents of the rounded significand 160 to determine if overflow occurred. In some embodiments, the rounding unit 58 may be able to identify overflow faster than the renormalization unit 59. If needed, the renormalization unit 59 can then renormalize the significand 160. However, the renormalization unit 59 need not adjust the exponent 161 produced by the rounding unit 58 since the rounding unit 58 has already adjusted the exponent. The Overflow bit helps the renormalization unit 59 identify a subnormal result ("subnormal" refers to a denormal value with an integer bit equal to zero).

Although FIG. 4 illustrates one example of a rounding operation that includes exponent adjustment due to normalization and renormalization, various changes may be made to FIG. 4. For example, FIG. 4 and its accompanying description have described the operands 150, 159 as including significands 151, 160. In other embodiments, the significands 151, 160 could be replaced by mantissas. Also, the exponent adjustment shown in FIG. 4 has been described as being performed by the rounding unit 58 in the floating point unit 50 of FIG. 2. The exponent adjustment shown in FIG. 4 could also be performed by any other floating point unit or other device. As an example, a specialized adder that does not insert a "one" bit between the exponent and the significand fields in the operands 150, 154 and the result 159 could be used. This adder has one operand which has concatenated $E_P$ 153 and $S_N$ 151 and a second operand which concatenates $E_{ADJ}$ 155 and zero 157. It also has inputs $E_{CI}$ 156 and $R_{CI}$ 158. It produces a result which concatenates $E_{PC}$ 161 and $S_{ROUND}$ 160 and a separate result $R_{CO}$ 162.

FIG. 5 illustrates an example method 200 for adjusting an exponent of a floating point number according to one embodiment of this disclosure. The method 200 is described with respect to the floating point unit 50 of FIG. 2 operating in the central processing unit 10 of FIG. 1. The method 200 could be used in any other suitable integrated circuit or device without departing from the scope of this disclosure.

The floating point unit 50 receives two floating point operands at step 201. This may include, for example, the floating point unit 50 receiving two operands 51, 52, each of which includes a mantissa or significand and an exponent.

The floating point unit 50 identifies the operand having the larger exponent at step 202. This may include, for example, the comparator 53 comparing the exponents of the operands 51, 52 to determine which is larger.

The floating point unit 50 aligns the operands at step 203. This may include, for example, the operand select unit 54 receiving the two operands 51, 52 and the results of the comparison from the comparator 53. This may also include the operand select unit 54 communicating the operand 51, 52 having the smaller exponent to the alignment unit 55 and the operand 51, 52 having the larger exponent to the adder 56. This may further include the alignment unit 55 adjusting the operand 51, 52 with the smaller exponent so that both operands 51, 52 have equal exponents.

The floating point unit 50 adds or subtracts the two operands at step 204. This may include, for example, the adder 56 adding the two operands 51, 52. This may also include the adder 56 converting one of the operands 51, 52 into a two's complement and adding the two's complement to the other operand.

The floating point unit 50 normalizes the sum if needed at step 205. This may include, for example, the normalization unit 57 receiving the sum produced by the adder 56. This may also include the normalization unit 57 adjusting the significand of the sum one position to the right, no positions, or one or more positions to the left. In some embodiments, this may further include the normalization unit 57 adjusting the exponent of the sum produced by the adder 56. In other embodiments, the normalization unit 57 does not adjust the exponent of the sum, even if the normalization unit 57 adjusts the significand of the sum.

The floating point unit 50 rounds the significand of the sum while adjusting the exponent of the sum (if needed) at step 206. This may include, for example, the rounding unit 58 generating and summing the operand or operands shown in FIGS. 3 and 4. This rounds the significand of the sum while, at the same time, adjusting the exponent of the sum. This may also include the rounding unit 58 determining whether the significand of the sum has overflowed as a result of the rounding.

The floating point unit 50 renormalizes the sum if needed at step 207. This may include, for example, the renormalization unit 59 determining whether the rounding unit 58 detected an overflow. This may also include the renormalization unit 59 adjusting the significand of the rounded sum produced by the rounding unit 58. Because the rounding unit 58 already adjusted the exponent of the sum at step 206, the renormalization unit 59 does not adjust the exponent of the sum even if the renormalization unit 59 adjusts the significand.

Although FIG. 5 illustrates one example of a method 200 for adjusting an exponent of a floating point number, various changes may be made to FIG. 5. For example, the floating point unit 50 does not need to both round the significand produced by the adder and adjust the exponent of the sum. In some cases, the significand is rounded while the exponent remains unchanged. In other cases, the significand is not rounded, but the exponent is adjusted.

It may be advantageous to set forth definitions of certain words and phrases that have been used within this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A floating point unit, comprising:
   an adder operable to add two floating point operands to produce a sum, the sum comprising an exponent and at least one of a significand and a mantissa;
   a normalization unit operable to normalize at least one of the significand and the mantissa of the sum without adjusting the exponent;
   a rounding unit operable to round the sum and to adjust the exponent to compensate, if necessary, for one or more of normalization of one of the significand and the mantissa of the sum, rounding of the sum, and renormalization of one of the significand and the mantissa of the sum; and
   a renormalization unit operable to renormalize one of the significand and the mantissa of the sum without adjusting the exponent,
   wherein the rounding unit is operable to round the sum and to adjust the exponent by adding one or more values to a third operand, the third operand comprising the exponent and at least one of the significand and the mantissa of the sum, and
   wherein the normalization unit is operable to normalize at least one of the significand and the mantissa by performing zero or more position changes without adjusting the exponent, and wherein the rounding unit is operable to round the sum and to adjust the exponent by:
      appending the exponent of the sum, a single bit having a value of one, and at least one of a normalized significand and a normalized mantissa to generate the third operand; and
      appending an exponent adjustment value, an exponent carry-in value, and a string of zeros to generate a fourth operand, the exponent adjustment value and the exponent carry-in value based at least partially on a number of position changes; and summing the third operand, the fourth operand, and a round carry-in value.

2. The floating point unit of claim 1, wherein:
   the adjustment to the exponent by the rounding unit compensates both for the normalization of at least one of the significand and the mantissa of the sum and for the renormalization of at least one of the significand and the mantissa of the sum.

3. The floating point unit of claim 1, wherein each of the floating point operands includes an exponent, the floating point unit further comprising:
   a comparator operable to compare the exponents of the floating point operands;
   an alignment unit operable to align the floating point operand having a smaller exponent with the floating point operand having a larger exponent such that the exponents of the floating point operands are equal; and
   an operand selector operable to provide the floating point operand having the smaller exponent to the alignment unit and to provide the floating point operand having the larger exponent to the adder.

4. The floating point unit of claim 1, wherein the third operand comprises the exponent, the significand and the mantissa.

5. The floating point unit of claim 1, wherein the rounding unit is further operable to detect when rounding the sum causes an overflow, and wherein the renormalization unit is operable to renormalize the portion of the sum when the rounding unit detects the overflow.

6. The floating point unit of claim 1, wherein the third operand comprises the exponent and the significand.

7. The floating point unit of claim 1, wherein the third operand comprises the exponent and the mantissa.

8. A central processing unit, comprising:
   a memory operable to store integer instructions and floating point instructions;
   an integer unit operable to execute the integer instructions; and
   a floating point unit operable to execute the floating point instructions, the floating point unit comprising:
      an adder operable to add two floating point operands to produce a sum, the sum comprising an exponent and at least one of a significand and a mantissa;
      a normalization unit operable to normalize at least one of the significand and the mantissa of the sum without adjusting the exponent;
      a rounding unit operable to round the sum and to adjust the exponent to compensate, if necessary, for one or more of normalization of one of the significand and the mantissa of the sum, rounding of the sum, and renormalization of one of the significand and the mantissa of the sum; and
      a renormalization unit operable to renormalize one of the significand and the mantissa of the sum without adjusting the exponent,
      wherein the rounding unit is operable to round the sum and to adjust the exponent by adding one or more values to a third operand, the third operand comprising the exponent and at least one of the significand and the mantissa of the sum,
      wherein the normalization unit is operable to normalize at least one of the significand and the mantissa by performing zero or more position changes without adjusting the exponent, and wherein the rounding unit is operable to round the sum and to adjust the exponent by:
         appending the exponent of the sum, a single bit having a value of one, and at least one of a normalized significand and a normalized mantissa to generate the third operand;
         appending an exponent adjustment value, an exponent carry-in value, and a string of zeros to generate a fourth operand, the exponent adjustment value and the exponent carry-in value based at least partially on a number of position changes; and
         summing the third operand, the fourth operand, and a round carry-in value.

9. The central processing unit of claim 8, wherein
   the adjustment to the exponent by the rounding unit compensates both for the normalization of at least one of the significand and the mantissa of the sum and for the renormalization of at least one of the significand and the mantissa of the sum.

10. The central processing unit of claim 8, wherein each of the floating point operands includes an exponent, and wherein the floating point unit further comprises:
a comparator operable to compare the exponents of the floating point operands;
an alignment unit operable to align the floating point operand having a smaller exponent with the floating point operand having a larger exponent such that the exponents of the floating point operands are equal; and
an operand selector operable to provide the floating point operand having the smaller exponent to the alignment unit and to provide the floating point operand having the larger exponent to the adder.

11. The central processing unit of claim 8, wherein the third operand comprises the exponent, the significand and the mantissa.

12. The central processing unit of claim 8, further comprising:
a load/store unit operable to facilitate storage and retrieval of data in a system memory;
a prefetch buffer operable to prefetch at least a portion of the instructions from the memory; and
a fetch and decode unit operable to fetch the instructions from the prefetch buffer, decode the instructions, and issue the decoded instructions to one or more of the integer unit, the floating point unit, and the load/store unit.

13. The central processing unit of claim 8, wherein the third operand comprises the exponent and the significand.

14. The central processing unit of claim 8, wherein the third operand comprises the exponent and the mantissa.

15. A method, comprising:
using an adder within a processing device, adding two floating point operands to produce a sum comprising an exponent and at least one of a significand and a mantissa;
using a normalization unit within the processing device, normalizing at least one of the significand and the mantissa of the sum without adjusting the exponent;
using a rounding unit within the processing device, rounding the sum and adjusting the exponent during the rounding to compensate, if necessary, for one or more of normalization of one of the significand and the mantissa of the sum, rounding of the sum, and renormalization of one of the significand and the mantissa of the sum, wherein the rounding and the adjusting comprise adding one or more values to a third operand, the third operand comprising the exponent and at least one of the significand and the mantissa of the sum; and
using a renormalization unit within the processing device, renormalizing one of the significand and the mantissa of the sum without adjusting the exponent,
wherein rounding the sum and adjusting the exponent comprises:
appending the exponent of the sum, a single bit having a value of one, and at least one of the normalized significand and the normalized mantissa to generate the third operand;
appending an exponent adjustment value, an exponent carry-in value, and a string of zeros to generate a fourth operand, the exponent adjustment value and the exponent carry-in value based at least partially on a number of position changes; and
summing the third operand, the fourth operand, and a round carry-in value.

16. The method of claim 15, wherein:
adjusting the exponent compensates both for the normalization of at least one of the significand and the mantissa and for the renormalization of at least one of the significand and the mantissa of the sum.

17. The method of claim 15, wherein each of the floating point operands includes an exponent, the method further comprising:
using a comparator within the processing device, comparing the exponents of the floating point operands; and
using an alignment unit within the processing device, aligning the floating point operand having a smaller exponent with the floating point operand having a larger exponent such that the exponents of the floating point operands are equal, wherein adding the floating point operands comprises adding the floating point operands after the aligning.

18. The method of claim 15, wherein the third operand comprises the exponent, the significand and the mantissa.

19. The method of claim 15, wherein the third operand comprises the exponent and the significand.

20. The method of claim 15, wherein the third operand comprises the exponent and the mantissa.

* * * * *